United States Patent
Kupski et al.

(10) Patent No.: US 10,144,170 B2
(45) Date of Patent: Dec. 4, 2018

(54) DEVICE AND METHOD FOR SHAPING A SEMI-FINISHED FIBER PRODUCT

(71) Applicant: Airbus Operations GmbH, Hamburg (DE)

(72) Inventors: Julian Kupski, Hamburg (DE); Thomas Hoffmeister, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 216 days.

(21) Appl. No.: 15/192,699

(22) Filed: Jun. 24, 2016

(65) Prior Publication Data

US 2016/0375626 A1 Dec. 29, 2016

(30) Foreign Application Priority Data

Jun. 24, 2015 (DE) .......................... 10 2015 110 195

(51) Int. Cl.
*B29C 53/02* (2006.01)
*B29C 53/04* (2006.01)
(Continued)

(52) U.S. Cl.
CPC .............. *B29C 53/04* (2013.01); *B29C 53/02* (2013.01); *B29C 53/80* (2013.01);
(Continued)

(58) Field of Classification Search
None
See application file for complete search history.

(56) References Cited

U.S. PATENT DOCUMENTS

2006/0249868 A1* 11/2006 Brown ................. B29C 70/342
264/163
2009/0026315 A1* 1/2009 Edelmann ............ B29C 70/205
244/119
(Continued)

FOREIGN PATENT DOCUMENTS

DE 10 2005 028 765 12/2006
DE 10 2011 119 220 5/2013
(Continued)

OTHER PUBLICATIONS

German Search Report cited in 10 2015 110 195.5 dated Oct. 28, 2015, 7 pages.

*Primary Examiner* — Erma C Cameron
(74) *Attorney, Agent, or Firm* — Nixon & Vanderhye P.C.

(57) ABSTRACT

A device for shaping a semi-finished fiber product for manufacturing a C-shaped or I-shaped former, and including clamping mechanisms and a forming tool. Each clamping mechanism has a first and a second clamping element and together they hold a semi-finished fiber product along two longitudinal and opposite edges. The clamping elements and forming tool move in a coupled manner between starting and end positions. During this movement, the longitudinal edges of the semi-finished fiber product are transformed into a curved shape, wherein a length of one of the longitudinal edges of the semi-finished fiber product does not change and a length of the other longitudinal edge becomes greater. During the movement, the forming tool is transformed into a curved shape and guided relative to the clamping elements against the semi-finished fiber product such that the semi-finished fiber product is deep drawn over the forming tool.

8 Claims, 3 Drawing Sheets

(51) Int. Cl.
  *B29C 53/80* (2006.01)
  *B29K 63/00* (2006.01)
  *B29K 105/08* (2006.01)
  *B29K 307/04* (2006.01)
  *B29L 31/30* (2006.01)

(52) U.S. Cl.
  CPC .. *B29K 2063/00* (2013.01); *B29K 2105/0872* (2013.01); *B29K 2307/04* (2013.01); *B29L 2031/3082* (2013.01)

(56) References Cited

U.S. PATENT DOCUMENTS

| | | | |
|---|---|---|---|
| 2009/0039208 A1* | 2/2009 | Raeckers | B29C 65/5042 244/35 R |
| 2009/0139644 A1* | 6/2009 | Nogueroles Vines | B29C 33/308 156/250 |
| 2010/0148005 A1* | 6/2010 | Weidmann | B29C 70/32 244/119 |
| 2010/0263789 A1* | 10/2010 | Graber | B29B 11/16 156/228 |
| 2011/0104432 A1* | 5/2011 | Duqueine | B29C 33/405 428/113 |
| 2012/0090768 A1* | 4/2012 | Schoppmeier | B29C 70/30 156/163 |
| 2013/0139945 A1* | 6/2013 | Buerkner | B29C 33/505 156/60 |

FOREIGN PATENT DOCUMENTS

| | | |
|---|---|---|
| EP | 1 666 353 | 6/2006 |
| EP | 1 972 426 | 9/2008 |
| WO | 2006/119002 | 11/2006 |

* cited by examiner

DEVICE AND METHOD FOR SHAPING A SEMI-FINISHED FIBER PRODUCT

RELATED APPLICATION

This application claims priority to German patent application 10 2015 110 195.5, filed Jun. 24, 2015, the entirety of which is incorporated by reference.

BACKGROUND OF INVENTION

The present invention relates to a device and to a method for shaping a semi-finished fiber product for manufacturing a C-shaped or I-shaped former or rib.

Fibrous composite materials, or fiber composite materials, are being used to an increasingly greater degree in the aerospace industry in order to reduce the weight of structural elements without compromising high load-bearing capacity. Fibrous composite materials are essentially formed from two components: a matrix and the fibers embedded in the matrix. Fibrous composite materials are able to absorb the greatest loads in the direction of extension of the fibers. Hence the direction in which the fibers run or extend is a decisive factor, particularly in the case of curved structural elements. In the case of a C-shaped former or rib for an aircraft, for example, it is desirable for the fibers to always run parallel to one another, both in the area of the web or cross-member, the curvature of which follows the fuselage shape perpendicular to the longitudinal axis of the aircraft, and in the area of the flanges extending perpendicular to the web.

An exact orientation of the fibers would be achievable if one would position each fiber individually on a mold. However, the expenditure of effort for doing so is unreasonably high. Instead the fibers are generally provided as rectangular fiber blanks, wherein the fibers within a fiber blank essentially run parallel to each other. For example, the fibers can run parallel to a longitudinal direction of the fiber blank, at an angle of +45° or −45° (plus or minus forty five degrees) to the longitudinal direction, or perpendicular to the longitudinal direction. If the fiber blanks have already been impregnated with matrix material, then they are also designated as prepreg. The structural element is then formed from a plurality of fiber blanks disposed one on top of the other rather than from a single fiber blank. Such multilayer packages composed of fiber blanks disposed one on top of the other shall henceforth be designated as semi-finished fiber products. However, in this regard it must be pointed out that in principle a semi-finished fiber product can also be made from the single fiber blank. In a semi-finished fiber product, the fibers of the different fiber blanks generally run at different angles with respect to each other. For example, the fibers of sequential or successive layers can always be arranged at an angle of 45° to one another.

In order to form the actual structural element, for example a C-shaped former, the flat semi-finished fiber product must be brought into the future shape of the structural element. In the case of a C-shaped former, this means that the semi-finished fiber product must be shaped such that the web or cross-member follows the curvature or curve of the fuselage shape perpendicular to the longitudinal axis of the aircraft and that the flanges extend parallel to one another and away from the web, perpendicularly thereto. This shaping is generally carried out in two steps: the semi-finished fiber product is first positioned in such a way that it follows the curvature or curve of the web. The web of a C-shaped former, or simply C-former, has two longitudinal edges, of which a first or inner longitudinal edge is shorter than a second or outer longitudinal edge. The different lengths of the first and second longitudinal edges of the former result from the radius that increases over the width of the web and defines the curvature of the web. Because the fibers of the semi-finished fiber product should follow the curvature of the web and should always run parallel to one another, the semi-finished fiber product must be drawn into shape. During this process it is essential to prevent creases from forming along the shorter first longitudinal edge or cracks from forming in the semi-finished fiber product due to substantial tension along the longer second longitudinal edge.

Subsequently, the two flanges are formed by bending or folding the semi-finished fiber product 90°. The problem that the fibers should run parallel when possible arises here as well. For example, fibers running on the web parallel to the longitudinal edges of the web should only run along the web and not across or over the bend between the web and one of the flanges. It is also necessary to prevent cracks or creases, respectively, from forming on the flanges in the semi-finished fiber product. The problem of bulges forming in the transition between the web and the flanges also arises because the radius of the semi-finished fiber product at the transition is larger at the outer layers than at the inner layers, but the layers frequently cannot be displaced relative to one another. These bulges are generally also referred to as book effect. Because an undulation forms in the radius of the semi-finished fiber product and the fibers then raise up in a wave-like manner, the number of fibers per unit volume changes erratically or in an uncontrolled manner. It is essential to prevent this from happening, particularly in the transition between web and flange of a former, because particularly high mechanical forces occur in this zone.

In view of the problems arising from the prior art, the person skilled in the art is faced with the problem of providing a device and a method for shaping a semi-finished fiber product for manufacturing a C-shaped or I-shaped former or rib with which initially some and preferably all of the problems known from the prior art are solved.

SUMMARY OF THE INVENTION

In a first aspect, this problem is solved by a device for shaping a semi-finished fiber product for manufacturing a C-shaped or I-shaped former, or rib or frame. The device comprises a plurality of clamping mechanisms or devices and a forming tool, mold or die. Each clamping mechanism has a first and a second clamping element. The first clamping elements are configured and disposed for holding a semi-finished fiber product along a first longitudinal edge of the semi-finished fiber product and the second clamping elements are configured and disposed for holding the semi-finished fiber product along a second longitudinal edge of the semi-finished fiber product, wherein the first and the second longitudinal edges of the semi-finished fiber product are opposite one another. To shape a semi-finished fiber product held by the clamping elements, the first clamping elements, the second clamping elements, and the forming tool are movable in a coupled manner between a respective starting position and a respective end position. In this regard, as the first clamping elements move from their starting position into their end position, the first longitudinal edge of the semi-finished fiber product is transformed or deformed from a straight shape into a curved shape, wherein a length of the first longitudinal edge of the semi-finished fiber product does not change. Furthermore, as the second clamping elements move from their starting position into their end position, the second longitudinal edge of the semi-finished fiber product is transformed or deformed from a straight shape into a curved shape, wherein a length of the second longitudinal edge of the semi-finished fiber product, i.e., in the circumferential direction of the former, becomes greater. Lastly, as the first clamping elements and/or the second clamping elements move from their respective starting position into their respective end position, the forming tool is transformed or deformed into a curved shape and guided against the semi-finished fiber product such that the semi-finished fiber product is deep drawn over the forming tool or die.

In other words, the device according to an embodiment of the invention comprises a plurality of clamping mechanisms or devices that each have a first and a second clamping element. These clamping elements can be displaced along predefined paths from a starting position into an end position. During the displacement of the clamping elements, a semi-finished fiber product, which can be formed from a plurality of fiber blanks disposed one on top of the other or from a single fiber blank, is deformed or shaped in a plane in a predetermined manner. The fiber blanks are for example formed from a prepreg with carbon fibers. However, it is also conceivable for the fiber blanks to have glass fibers or metal fibers. As an alternative, the device can also be used to shape a fiber fleece or non-woven material instead of a semi-finished fiber product having several layers each having only unidirectional fibers, i.e., fibers running parallel to one another and in one direction.

In principle all natural and synthetic materials can be used as starting material for the fibers, provided that a flat, unidirectional fabric can be formed from the manufactured fibers. The selection of the source or starting material for the fibers is primarily limited by the intended use of the rib. For example, fibers based on carbon, glass, aramid, basalt, or also based on polyethylene could be used. In principle the use of natural fibers, for example ones made of hemp, would also be conceivable for certain fields of application.

The predetermined or predefined paths along which the first and second clamping elements can be moved from their respective starting position into their respective end position are selected such that a length of the first longitudinal edge of the semi-finished fiber product to be shaped, i.e., the longitudinal edge being held by the first clamping elements, does not change and in particular is not shortened. For example, the first clamping elements are displaced from starting positions, which all lie on a straight line, into end positions, which lie along an arc segment, wherein the length of the arc segment corresponds to the length of the straight line. In this manner creases are prevented from forming in the semi-finished fiber product on the section of the C-shaped or I-shaped former that has a smaller radius. The spacing of the first clamping elements relative to one another thus remains constant during the displacement from the respective starting position into the respective end position. The second clamping elements likewise move along predefined paths. Because the second clamping elements hold a second longitudinal edge of the semi-finished fiber product that is opposite the first longitudinal edge, these paths have been chosen such that a length of the second longitudinal edge of the semi-finished fiber product becomes greater in order to produce the larger radius of the C-shaped or (shaped former or rib. The second clamping elements can, for example, likewise be oriented along a straight line in their starting positions and lie along an arc segment in their end positions. The holding or retaining force of the first and second clamping elements is chosen sufficiently high such that when the first and second clamping elements are moved the semi-finished fiber product moves along with them and is shaped or deformed.

In parallel with the movement of the first and second clamping elements, a forming tool or die is shaped and moved against the semi-finished fiber product such that this forming tool is deep drawn over the semi-finished fiber product. In order for this to happen, the semi-finished fiber product must be disposed between the first and second clamping elements and must be flexible enough so that it can duplicate the curvature that will be defined by the first and second clamping elements in the end positions. While the forming tool is being bent, the forming tool simultaneously moves towards the semi-finished fiber product and ultimately against the semi-finished fiber product such that the semi-finished fiber product is shaped or molded around the forming tool in order to form the web and the flange or flanges of the former or rib being manufactured. The forming tool is thus transformed from a cuboid shape with straight outer edges into the shape of a curved cuboid. Initially it does not matter during this process whether, for example, the forming tool is moved vertically from below against the semi-finished fiber product or whether, for example, a vertical movement of the clamping elements guides the semi-finished fiber product against the forming tool. Only the relative movement between the semi-finished fiber product held or retained by the clamping elements and the forming tool or die is important.

By means of the coupled movement of first clamping elements, second clamping elements, and the forming tool, a coupled, controlled shaping of a semi-finished fiber product in three dimensions is effected in an advantageous manner. During this process, the clamping elements and the forming tool or die are guided such that no creases can form in the semi-finished fiber product, as this semi-finished fiber product is always held uniformly taut by the plurality of clamping elements. In addition, the simultaneous shaping of the forming tool or die and of the semi-finished fiber product ensures that the fibers always run in the desired direction along the forming tool and consequently also along the future sections of the former or rib.

Compared to prior art shaping methods, the device according to an embodiment of the invention firmly clamps the semi-finished fiber product to be shaped in linear fashion along both longitudinal edges. As a result of the strong clamping force, the quality of the shaping is considerably higher than if the semi-finished fiber product is simply draped locally without uniform and distributed tension. Further there is the possibility to shape the entire multilayer package or unit, which is required for manufacturing a former or rib, in a single step, and to exploit the synergy from three superimposed movements and relative displacements of the individual layers among each other here as well.

In an embodiment of the invention, the clamping mechanisms are designed such that a spacing between the first and the second clamping elements of each clamping mechanism is reduced during the movement of the first clamping elements and the second clamping elements from their respective starting position into their respective end position. This is particularly advantageous if the depth of the former to be manufactured perpendicular to the web and/or the dimensions of the flange or flanges, which are formed by the deep drawing against the forming tool, cannot be achieved by a stretching of the semi-finished fiber product.

In an alternative embodiment of the invention, the first and second clamping elements of each clamping mechanism are rigidly connected to each other. For example, the first and second clamping elements can be disposed on a common guide element. The coupled movement of the first and second clamping elements of each clamping mechanism is thus ensured in a particularly simple manner. In addition, only one path of movement needs to be defined for each clamping mechanism, which simplifies both the design of the drive and the coupled movement.

In this regard it is particularly preferable if the clamping elements are moved via a common drive, for example via a hydraulic actuator. The movement via a common drive requires a mechanical coupling of the first and second clamping elements of all clamping mechanisms that ensures, in a particularly robust and reliable manner, a coupled and repeatable movement of the first clamping elements, of the second clamping elements, and of the forming tool from the respective starting position into the respective end position.

In an alternative exemplary embodiment, each of the clamping mechanisms and also the forming tool are moved by a separate drive, for example in the form of an electric motor. In principle, driving each clamping element of a clamping mechanism by a separate electric motor is also conceivable. In this case a coupled movement or a synchronization of the movements of the clamping elements and of the forming tool could be effected by an electronic control unit. As an alternative, providing individual hydraulic drives for the various clamping mechanisms or the clamping elements thereof and for the forming tool is also conceivable. A combination or mixture of electronic and hydraulic drives is also conceivable. Last but not least, groups of clamping mechanisms could also be combined and moved by a common drive, whereas the forming tool or die is only moved passively by the movement of the clamping mechanisms.

A mechanical coupling between the first clamping elements is achieved by connecting the first clamping elements via a connection or linkage assembly to one another in such a way that the spacing between the first clamping elements remains the same when the first clamping elements are moved from their respective starting position into their respective end position. In this manner it is prevented that creases form at the first longitudinal edge of the semi-finished fiber product held by the first clamping elements, as would be the case if the spacing between the first clamping elements were to become smaller. This also prevents the spacing of the first clamping elements from first becoming greater and then becoming smaller again during the movement from the starting position such that the length of the first longitudinal edge of the semi-finished fiber product, even though it ends up being the same in the starting position and in the end position of the first clamping elements, has become greater in the interim because of the movement of the first clamping elements, which could also have the result that creases form in the semi-finished fiber product.

If the common drive engages one of the first clamping elements and if the connection assembly is configured such that a movement of the first clamping element, with which the common drive engages, is transmitted via the connection assembly to the rest of the first clamping elements such that a coupled movement of the first clamping elements takes place. In other words, in a particularly advantageous manner a mechanical coupling of the first clamping elements via the connection assembly is provided that simultaneously ensures that the spacing between the first clamping elements always stays the same. For example, a strip made of a metal that is not expandable in response to the forces arising in the present device can be used as connection assembly.

The forming tool or die is preferably configured as an integral unit or a single piece. The advantage of this over multi-piece or multi-part forming tool lies in the fact that no kinks or edges, which would diminish the load-bearing capacity of the former produced from the semi-finished fiber product, can arise in the semi-finished fiber product due to the forming tool itself, at transitions between different sections of the forming tool.

In an embodiment of the invention, the device has a plurality of wedge-shaped elements, which are configured and disposed in such a way that, during a movement of the first and/or of the second clamping elements from the respective starting position into the respective end position, the forming tool is brought into contact with the wedge-shaped elements and guided against the semi-finished fiber product by a movement relative to the clamping elements along inclined surfaces of the wedge-shaped elements. In other words, the device comprises a plurality of wedge-shaped elements, which for example are disposed stationarily in relation to the first and the second clamping elements, such that during a movement of the first and second clamping elements into the end positions into the wedge-shaped elements move relative to the clamping elements. The wedge-shaped elements have an inclined surface along which the forming tool is displaceable. To this end, the forming tool or die preferably has a sliding surface that is configured to be brought into contact with the inclined surfaces of the wedge-shaped elements and to slide on the inclined surfaces of the wedge-shaped elements. The forming tool can, for example, be displaced by the first clamping elements towards the inclined surfaces and, by the movement along the inclined surfaces, execute a simultaneous vertical movement against the semi-finished fiber product. In this manner a mechanical coupling arises between the movement of the first clamping elements and the forming tool, which not only brings about a bending in the forming tool but also simultaneously brings about the relative movement between the forming tool and the semi-finished fiber product needed for the deep drawing of the semi-finished fiber product, without requiring complex supplemental drives.

In an embodiment of the invention, the forming tool is made of an elastic material that is deformable in a volume-constant manner. For example, the forming tool or die can be made of rubber.

The invention may be embodied as a method of shaping a semi-finished fiber product for manufacturing a former with a device that comprises a plurality of clamping mechanisms and a forming tool. Each clamping mechanism has a first and a second clamping element, wherein the first clamping elements hold the semi-finished fiber product to be shaped along a first longitudinal edge of the semi-finished fiber product and the second clamping elements hold the semi-finished fiber product along a second longitudinal edge of the semi-finished fiber product, wherein the first and the second longitudinal edges of the semi-finished fiber product are opposite one another. For shaping the semi-finished fiber product held or retained by the clamping elements, the first clamping elements, the second clamping elements, and the forming tool or die are moved in a coupled manner between a respective starting position and a respective end position in such a way that, during the movement of the first clamping elements from their starting position into their end position, the first longitudinal edge of the semi-finished fiber product is transformed from a straight shape into a curved shape, wherein a length of the first longitudinal edge of the semi-finished fiber product does not change, that during the movement of the second clamping elements from their starting position into their end position, the second longitudinal edge of the semi-finished fiber product is transformed from a straight shape into a curved shape, wherein a length of the second longitudinal edge of the semi-finished fiber product becomes greater, and that during the movement of the first clamping elements and the second clamping elements from their respective starting position into their respective end position, the forming tool is transformed into a curved shape and the forming tool is guided relative to the clamping elements against the semi-finished fiber product such that the semi-finished fiber product is deep drawn over the forming tool or die.

The invention may be embodied as a method, in which a spacing between the first and second clamping elements of each clamping mechanism decreases during the movement of the first clamping elements and the second clamping elements from their respective starting position into their respective end position.

In an alternatively preferred embodiment of the method, a spacing between the first and second clamping elements of each clamping mechanism remains the same during the movement of the first clamping elements and the second clamping elements from their respective starting position into their respective end position.

It is further preferred if the device comprises a plurality of wedge-shaped elements and during the movement of the first and/or the second clamping elements from the respective starting position into the respective end position the forming tool is brought into contact with the wedge-shaped elements and is guided against the semi-finished fiber product by a movement along inclined surfaces of the wedge-shaped elements relative to the clamping elements.

Lastly, in another preferred embodiment of the method the forming tool has a sliding surface that is brought into contact with the inclined surfaces of the wedge-shaped elements and slides along on the inclined surfaces of the wedge-shaped elements.

The advantages of the different embodiments of the method according to the invention correspond to the advantages of the devices according to the invention, which have device features that correspond to the method features of the different embodiments of the method.

SUMMARY OF THE DRAWINGS

In the following the invention is explained in greater detail with reference to the drawings, which illustrate an exemplary embodiment of a device according to the invention. The drawings show in FIG. 1 is a perspective view of an exemplary embodiment of a device according to the invention for shaping a semi-finished fiber product.

DETAILED DESCRIPTION OF THE INVENTION

Figure 1:
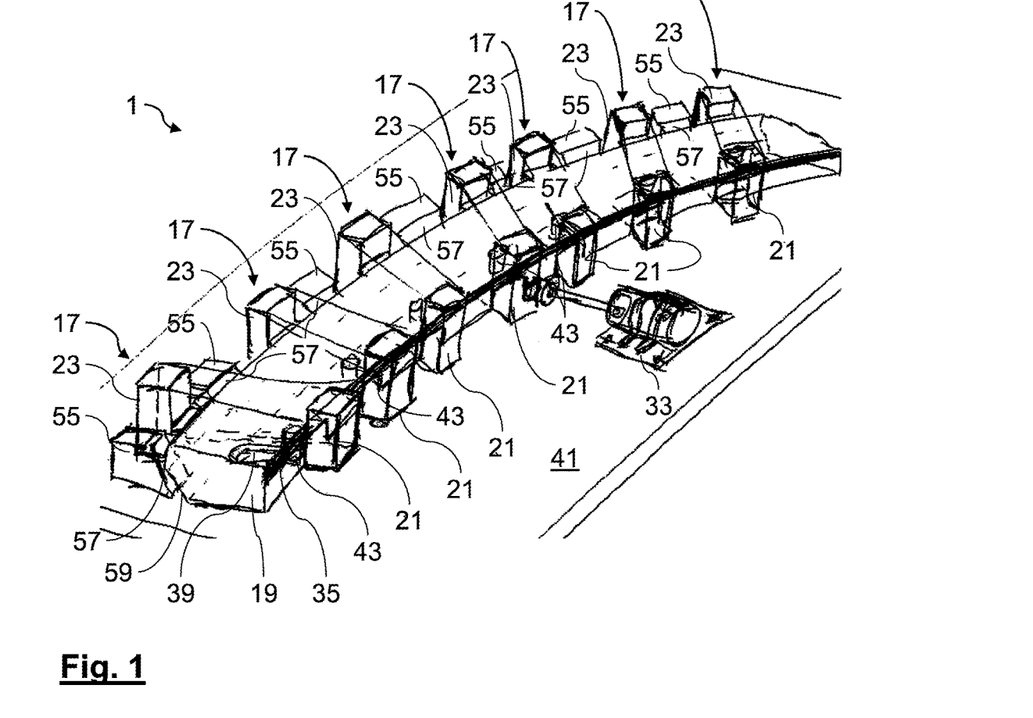
Figure 2:
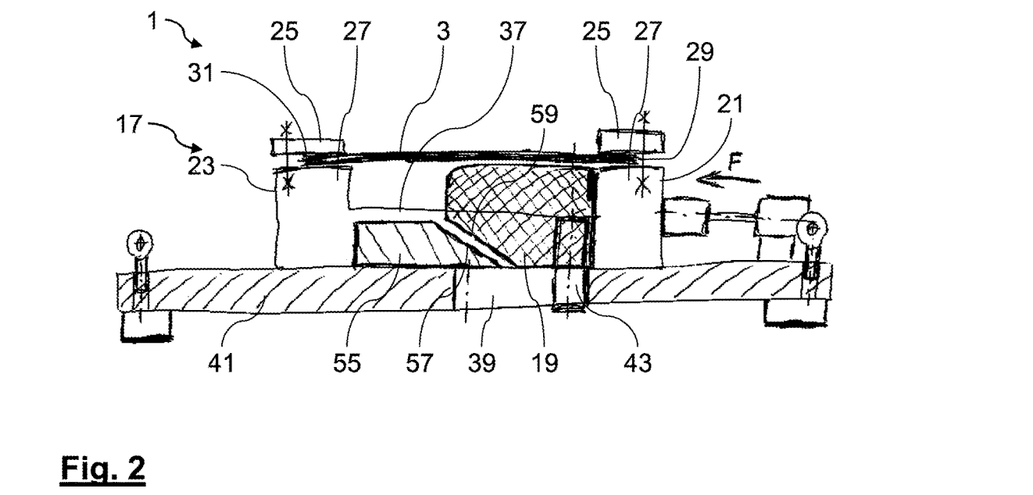
FIG. 2 is a sectional view through the device illustrated in FIG. 1.

An exemplary embodiment of a device 1 for shaping a semi-finished fiber product 3 for manufacturing a C-shaped former or rib is illustrated in FIGS. 1 and 2. For the sake of clarity, the semi-finished fiber product 3 is only illustrated in FIG. 2.

Figure 6:
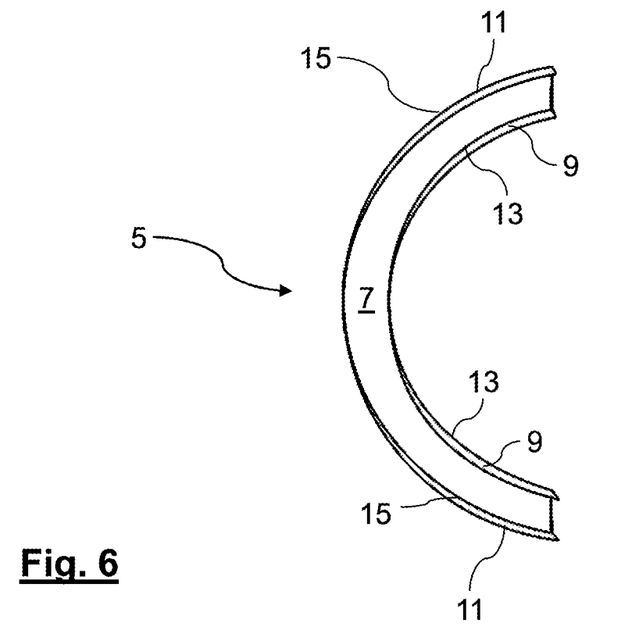
FIG. 6 is a schematic illustration of a C-shaped former or rib.

In order to make the following description more easily understood, the design of a C-shaped former 5 will first be explained briefly with reference to FIG. 6. The C-shaped former or rib 5 could be produced from, for example, a semi-finished fiber product that has been shaped with the device illustrated in FIGS. 1 and 2. The C-shaped former 5 comprises a web or cross-member 7 as well as a first flange 9 and a second flange 11. The C-shaped former 5 can be used as, for example, a structural element for reinforcing an airplane fuselage. Thus the C-shaped former or rib 5, and more precisely its web 7, has a curvature that corresponds to the curvature of the fuselage. To form the curvature, a first inner longitudinal edge 13 must follow an arc segment with a smaller radius than a second outer longitudinal edge 15 of the web 7. In other words, the first longitudinal edge 13 of the web 7 is shorter than the second longitudinal edge 15 of the web 7. The two flanges 9, 11 extend perpendicularly away from the surface of the web 7, which surface extends between the first and the second longitudinal edges 13, 15. An I-shaped former or rib, which can also be manufactured from a semi-finished fiber product shaped with a device according to the invention, is not illustrated. The I-shaped former has a shape comparable to that of the C-shaped former 5 illustrated in FIG. 6, but has only one of the two flanges 9, 11.

The device 1 comprises a plurality of clamping mechanisms or devices 17 and a forming tool or die 19. Each clamping mechanism 17 comprises a first clamping element 21 and a second clamping element 23. The forming tool 19 is made of rubber and is therefore flexible. Making the forming tool out of rubber has the advantage that it can be flexibly adapted to the future shape of the C-shaped former, or rather reversibly transformed into the shape thereof, but without changing its volume in the process, so that it is volume-constant.

The first clamping elements 21 and the second clamping elements 23 are configured for clamping, holding or retaining an essentially rectangular semi-finished fiber product 3 between two jaws 25, 27 that are only illustrated schematically in FIG. 2. In this regard, the first clamping elements 21 are arranged and configured to hold the semi-finished fiber product 3 along a first longitudinal edge 29 of the semi-finished fiber product 3, whereas the second clamping elements 23 are arranged and configured to hold the semi-finished fiber product 3 along a second longitudinal edge 31 of the semi-finished fiber product 3.

The semi-finished fiber product 3 consists of approximately thirty layers of flat fiber blanks disposed one on top of the other. Each fiber blank comprises unidirectional carbon fibers, which are oriented at an angle of 0°, +45°, −45° or 90° with respect to a longitudinal direction of the future semi-finished fiber product 3. The fibers of a layer or of a fiber blank all run parallel to one another and at the same angle to the future longitudinal direction of the semi-finished fiber product 3. The fiber blanks are preferably a so-called prepreg, i.e., the carbon fibers are already embedded in a matrix of, for example, epoxy resin.

The first clamping elements 21, second clamping elements 23, and the forming tool 19 are configured such that they can be moved in a coupled manner from a respective starting position into a respective end position. During the coupled movement from the respective starting positions into the respective end positions, the initially flat and essentially rectangular semi-finished fiber product 3 is adapted to the bend of the future C-shaped former 5 and deep drawn over the forming tool 19 in order to form the web 7 and the flanges 9, 11 of the C-shaped former 5. The coupled movement is subject to certain constraints in order to ensure that a simultaneous shaping of the semi-finished fiber product 3 in three dimensions takes place and that no creases arise during the shaping.

In the exemplary embodiment illustrated in the figures, the coupled movement of the clamping elements 21, 23 and of the forming tool 19 is effected via a mechanical coupling of the different components, which shall be described in more detail below. The mechanical coupling makes it possible to provide a common drive 33 in the form of a hydraulic cylinder 33, which engages one of the clamping mechanisms 17 or the first clamping element 21 of the clamping mechanism 17. Due to the mechanical coupling of the remaining clamping mechanisms 17 to the one clamping mechanism 17 with which the hydraulic cylinder 33 engages, the remaining clamping mechanisms 17 as well as the forming tool or die 19 passively follow the movement of the actively moved clamping mechanism 17.

In the exemplary embodiment illustrated in FIGS. 1 and 2, a mechanical coupling of the movement of the clamping mechanisms 17 with each other is achieved by means of a flat metal strip 35. The metal strip 35 is made of, for example, a stainless steel that is flexible yet not expandable or stretchable under the influence of the forces arising in the device 1. Because all of the first clamping elements 21 are connected in a stationary manner to the metal strip 35, the spacing between adjacent first clamping elements 21 does not change during the movement of the first clamping elements 21 from their respective starting position into their respective end position. This ensures that a length of the first longitudinal edge 29 of the semi-finished fiber product 3 remains constant during the movement of the first clamping elements 21 from their respective starting position into their respective end position and that no creases can form along the first longitudinal edge 29 during the shaping of the semi-finished fiber product 3.

The second clamping elements 23 are fixedly or rigidly connected to the respective first clamping elements 21 belonging to the same clamping mechanism 17. In the exemplary embodiment illustrated in the figures, the rigid connection 37, which is also referred to as guide element 37, is achieved by configuring the clamping mechanism 17 with its two clamping elements 21, 23 as an integral unit or as a single piece, with the exception of the upper jaws 27. The clamping mechanisms 17 can be made of wood, for example. In an advantageous manner, a coupled, and therefore predefined, movement of the first and second clamping elements 21, 23 is made possible with a common drive 33 by virtue of the rigid connection 37 of the first and second clamping elements 21, 23 of the clamping elements 17.

Due to the rigid connection 37 between the first and second clamping elements 21, 23 of the individual clamping mechanisms 17, it is furthermore possible to dispense with having to establish or determine an individual movement path for each first and second clamping element 21, 23. Owing to the additional mechanical coupling of the first clamping elements 17 via the metal strip 35, it suffices instead to define or establish a movement path for each clamping mechanism 17. In the exemplary embodiment illustrated in the figures, the movement paths are defined by elongate holes 39 which are formed in a base plate 41 of the device 1. For the sake of clarity, only one of these elongate holes 39 is illustrated in FIG. 1. Guide elements 43 in the form of tubes, which are fixedly connected to the fixed connections 37 between the first and the second clamping elements 21, 23, engage in the elongate holes 39. The configuration of the elongate holes 39 in the base plate 41 in conjunction with the connection assembly 35 in the form of the metal strip 35 determines or defines the movement of the first and the second clamping elements 21, 23 between their starting positions and their end positions. In this regard, the movement is configured such that the length of the first longitudinal edge 29 of the semi-finished fiber product 3 does not change during the movement from the starting positions into the end positions. However, the length of the second longitudinal edge 31 of the semi-finished fiber product 3, which edge is held by the second clamping elements 23, increases during this same movement.

Figure 4:
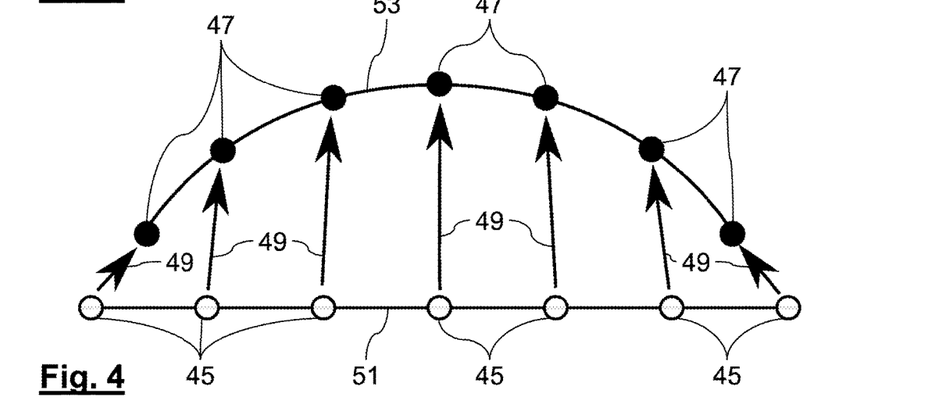
FIG. 4 is a schematic illustration of a possible movement of first clamping elements from their respective starting position into their respective end position in an exemplary embodiment of a device according to the invention.
Figure 5:
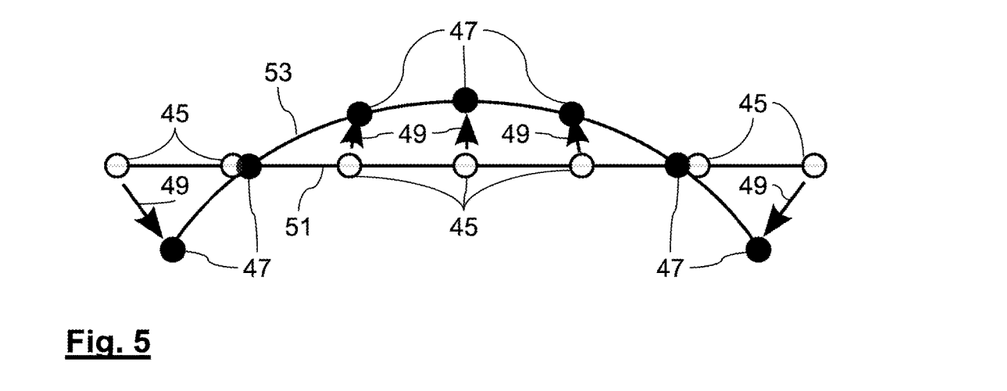
FIG. 5 is another schematic illustration of a possible movement of first clamping elements from their respective starting position into their respective end position according to another exemplary embodiment of a device according to the invention.

FIGS. 4 and 5 schematically illustrate two alternative movement paths for the first clamping elements 21, wherein it is ensured that the length of the first longitudinal edge 29 of the semi-finished fiber product 3 does not change. The starting and end positions of the first clamping elements 21 are represented by circles 45, 47 in FIGS. 4 and 5. The open circles 45 represent the starting positions 45 of the first clamping elements 21 and the solid circles 47 represent the corresponding end positions 47. The movement paths 49 between the starting and end positions 45, 47 are represented by arrows 49.

As can be clearly discerned, the starting positions 45 in both exemplary embodiments are arranged along a straight starting line 51, whereas the end positions 47 are arranged along an arc segment 53. The length of the arc segment 53 and of the straight starting line 51, which each extend between the outermost end positions 47 or starting positions 45, respectively, is the same. The curvature of the arc segment 51 is also the same in both exemplary embodiments. The exemplary embodiments differ from each other only in that in the exemplary embodiment illustrated in FIG. 4, all of the first clamping elements 21 move away from the straight starting line 51 in the same direction. The drive is easier to implement for this embodiment because all movements run away from the straight starting line 51 in the same direction. By contrast, in the second exemplary embodiment in FIG. 5 the first clamping elements 21 move away from the straight starting line 51 in different directions. This embodiment has the advantage that the absolute deflection or displacement of the first clamping elements 21 is considerably smaller and hence provision can be made of a more compact device 1.

The exemplary embodiment illustrated in FIGS. 1 and 2 can be configured such that the first clamping elements 21 follow either the movement paths illustrated in FIG. 4 or the movement paths illustrated in FIG. 5. However, other movement paths that lead to the same result are also conceivable in principle.

The movement of the forming tool or die 19 is also coupled with the movement of the first and second clamping elements 21, 23. During the movement of the first and second clamping elements 21, 23 from their starting positions 45 into their end positions 47, the forming tool 19 is not only bent but also moved in relation to the clamping elements 21, 23 in such a way that it is pressed against the semi-finished fiber product 3. In the exemplary embodiment illustrated in FIGS. 1 and 2, the movement of the forming tool 19 is effected in a passive manner, i.e., the clamping mechanisms 17 push the forming tool 19, which is disposed between the first and second clamping elements 21, 23, ahead. As the forming tool or die 19 is being displaced, it is not only bent but also pressed against wedge-shaped elements 55. The wedge-shaped elements 55 have an inclined surface 57, along which the forming tool 19 can slide, on a sliding surface 59, vertically away from the base plate 41 and against the semi-finished fiber product 3. To prevent the forming tool 19 from tilting, the slope of the sliding surface 59 relative to the base plate 41 corresponds to the slope of the inclined surface 57 relative to the base plate 41. As a result of the vertical movement of the forming tool 19 against the semi-finished fiber product 3, the semi-finished fiber product 3 is deep drawn in order to form the flanges 9, 11 of the C-shaped former 5.

Figure 3:
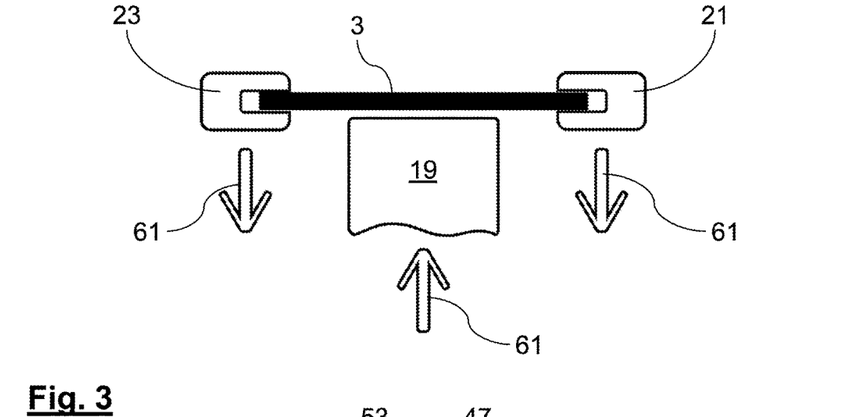
FIG. 3 is a schematic illustration of the relative movement between two clamping elements and a forming tool for deep drawing a semi-finished fiber product.

The deep drawing of the semi-finished fiber product 3, which is held along the first and second longitudinal edges 13, 15 by the first and second clamping elements 21, 23, is shown schematically in FIG. 3. The movement of the first and second clamping elements 21, 23 relative to the forming tool 19 is indicated here by arrows 61. In a particularly advantageous manner, the clamping force of the first and second clamping elements 21, 23 is chosen such that upon the engagement of the forming tool 19 with the semi-finished fiber product 3, the fiber blanks disposed on the side of the semi-finished fiber product 3 facing away from the forming tool 19 (also designated as outer fiber blanks) are able to slide out at least partially from the clamping elements 21, 23 relative to the fiber blanks disposed closer to the forming tool 19 (also designated as inner fiber blanks). In this manner it is possible to compensate for the fact that the outer fiber blanks must follow a larger radius than must the inner fiber blanks at the transitions between the web 7 and the flanges 9, 11. Thus bulges are prevented from forming on the inner fiber blanks due to surplus material at the transitions, which would unnecessary increase a thickness of the semi-finished fiber product 3 and consequently of the former or rib 5 to be produced as well.

The device 1 according to the invention thus enables, in an advantageous manner, a coupled shaping of a semi-finished fiber product 3 in three dimensions. By means of the continuous tension and the combined deep drawing, it is thus ensured that the fibers always run along the desired direction and that no creases form.

With reference to the device illustrated in FIGS. 1 and 2, a method according to the invention shall be briefly described in the following. In the method according to the invention, a flat semi-finished fiber product 3 with essentially rectangular dimensions is initially secured or clamped between the jaws 25, 27 of first and second clamping elements 21, 23 along its first and second longitudinal edges 13, 15. A coupled movement of the first clamping elements 21, of the second clamping elements 23, and of the forming tool or die 19 is then carried out. During this process, the first clamping elements 21 are moved along predetermined movement paths from starting positions 45 into end positions 47 in such a way that a length of the first longitudinal edge 13, which is held by the first clamping elements 21, does not change, but nevertheless a curving or bending of the semi-finished fiber product 3 occurs along the first longitudinal edge 13. Coupled herewith, the second clamping elements 23 are moved from their starting positions into their corresponding end positions such that the second longitudinal edge 15 also has a curvature. The movement of the forming tool 19 is also coupled with the movement of the first clamping elements 21 and of the second clamping elements 23. The forming tool 19 is not only bent by the movement of the clamping elements 21, 23 but also guided relative to the clamping elements 21, 23 against the semi-finished fiber product 3 such that the semi-finished fiber product 3 is deep drawn over the forming tool 19 into the shape of the C-shaped former or rib 5.

The relative movement of the forming tool 19 against the semi-finished fiber product 3 is induced by wedge-shaped elements 55, which have inclined surfaces 57 along which the forming tool 19 is moved, on a sliding surface 59, relative to the clamping elements 21, 23, against the semi-finished fiber product 3. These sliding surfaces 59, as well as all other sliding surfaces such as those between the clamping mechanisms 17 and the base plate 41 and also between the forming tool 19 and the base plate 41, can be coated such that the friction between the surfaces sliding against one another is reduced. The force required for moving the first and second clamping elements 21, 23 and the forming tool 19 along with them from the respective starting positions into the respective end positions can thus be reduced in an advantageous manner.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A method for shaping a semi-finished fiber product for manufacturing a former with a device comprising a plurality of clamping mechanisms and a forming tool, wherein each clamping mechanism comprises a first and a second clamping element, wherein the first clamping elements hold the semi-finished fiber product to be shaped along a first longitudinal edge and the second clamping elements hold the semi-finished fiber product along a second longitudinal edge, wherein the first and the second longitudinal edges of the semi-finished fiber product are opposite one another, and wherein for shaping the semi-finished fiber product held by the clamping elements, the first clamping elements, the second clamping elements, and the forming tool are moved in a coupled manner between a respective starting position and a respective end position, and the method comprises:

during the movement of the first clamping elements from their respective starting positions into their respective end positions, the first longitudinal edge of the semi-finished fiber product is transformed from a straight shape into a curved shape, wherein a length of the first longitudinal edge of the semi-finished fiber product does not change, during the movement of the second clamping elements from their respective starting positions into their respective end positions, the second longitudinal edge of the semi-finished fiber product is transformed from a straight shape into a curved shape, wherein a length of the second longitudinal edge of the semi-finished fiber product becomes greater, and during the movement of the first clamping elements and of the second clamping elements from their respective starting position into their respective end position, the forming tool is transformed into a curved shape and the forming tool is guided relative to the clamping elements against the semi-finished fiber product such that the semi-finished fiber product is drawn over the forming tool.

2. The method according to claim 1, wherein during the movement of the first clamping elements and of the second clamping elements from their respective starting position into their respective end position, a spacing between the first and the second clamping elements of each clamping mechanism is reduced.

3. The method according to claim 1, wherein during the movement of the first clamping elements and of the second clamping elements from their respective starting position into their respective end position, a spacing between the first and the second clamping elements of each clamping mechanism remains the same.

4. The method according to claim 1, wherein the device comprises a plurality of wedge-shaped elements, wherein during the movement of the first and/or of the second clamping elements from the respective starting position into the respective end position, the forming tool is brought into contact with the wedge-shaped elements and guided against the semi-finished fiber product by a movement along inclined surfaces of the wedge-shaped elements relative to the clamping elements.

5. The method according to claim 4, wherein the forming tool comprises a sliding surface that is brought into contact with the inclined surfaces of the wedge-shaped elements and slides along on the inclined surfaces of the wedge-shaped elements.

6. A method to shape a semi-finished fiber product configured to be used in the manufacture of a former:

arranging a device in a starting position, wherein first clamping elements of the device are at respective starting positions, second clamping elements of the device are at respective starting positions, and a forming tool of the device is at a respective starting position;

mounting the semi-finished fiber product in the device, wherein a first longitudinal edge of the semi-finished fiber product is held by the first clamping elements and a second longitudinal edge of the semi-finished fiber product is held by the second clamping elements;

after mounting the semi-finished fiber product, moving the device from the starting position to an end position by moving each of the first clamping elements, the second clamping elements and the forming tool from their respective starting positions to respective end positions;

during the movement of the first clamping elements, transforming the first longitudinal edge of the semi-finished fiber product from a straight shape into a curved shape, wherein the transformation does not increase the length of the first longitudinal edge of the semi-finished fiber product, during the movement of the second clamping elements, transforming the second longitudinal edge of the semi-finished fiber product from a straight shape into a curved shape, wherein the transformation increases the length of the second longitudinal edge of the semi-finished fiber product, and during the movements of the first clamping elements and of the second clamping elements, transforming the forming tool into a curved shape and pressing the forming tool against the semi-finished fiber product to draw the semi-finished fiber product over the forming tool.

7. The method according to claim 6, wherein during the movement of the first and/or of the second clamping elements from the respective starting position into the respective end position, the forming tool is brought into contact with wedge-shaped elements and guided against the semi-finished fiber product by a movement along inclined surfaces of the wedge-shaped elements relative to the clamping elements.

8. The method according to claim 7, wherein s a sliding surface of the forming tool is brought into contact with the inclined surfaces of the wedge-shaped elements and slides along on the inclined surfaces of the wedge-shaped elements.

* * * * *